April 7, 1970  W. R. LASKO ET AL  3,505,218
MULTIPHASE NON-METALLIC COMPOSITIONS OF MATTER
Filed June 28, 1968  8 Sheets-Sheet 6

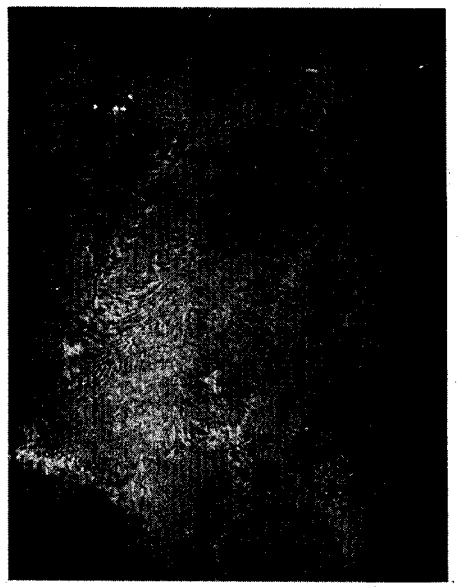
FIG. 1  As-Cast Transverse Section of LiF-NaF (200X)
FIG. 2  Unidirectionally Solidified Transverse Section of LiF-NaF (200X)
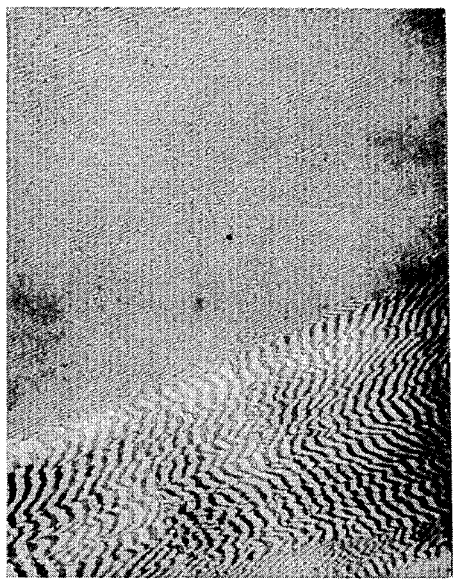

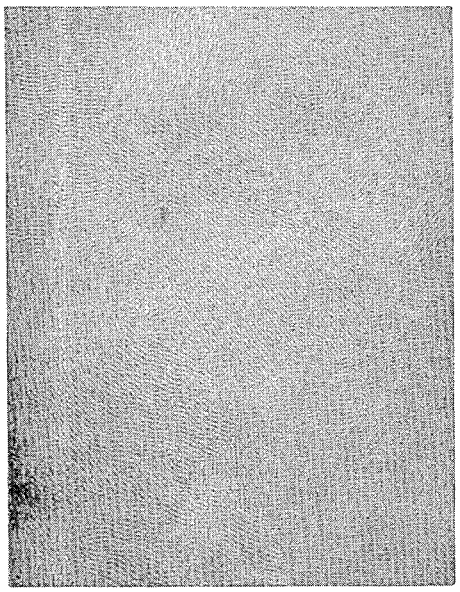
FIG. 3  Unidirectionally Solidified Longitudinal Section of LiF-NaF (200X)
FIG. 4  As-Cast Transverse Section of NaF-PbF$_2$ (200X)
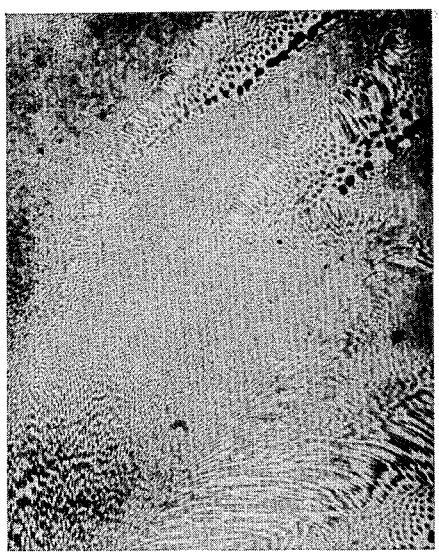

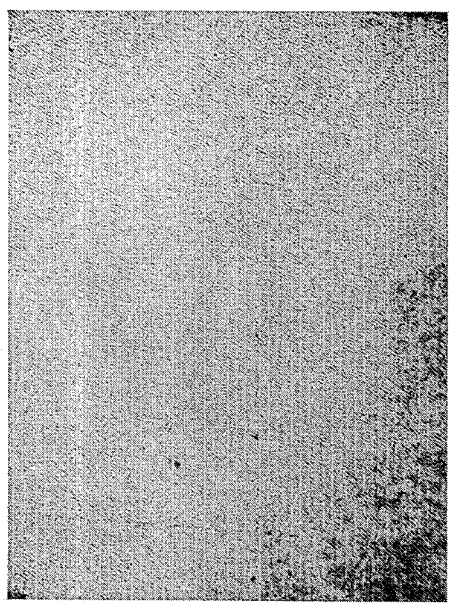
FIG. 5 Unidirectionally Solidified Transverse Section of NaF-PbF$_2$ (200X)
FIG. 6 Unidirectionally Solidified Longitudinal Section of NaF-PbF$_2$ (200X)
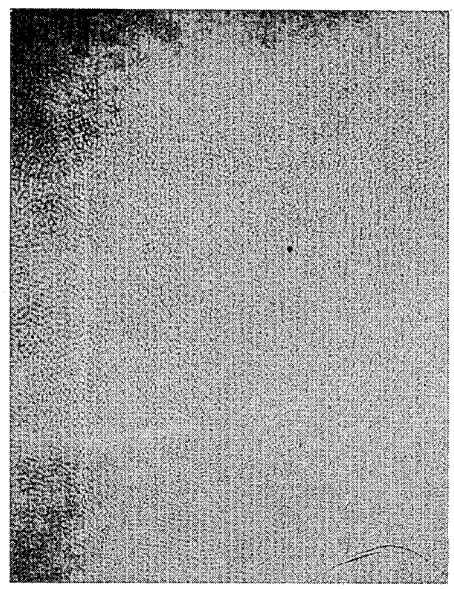

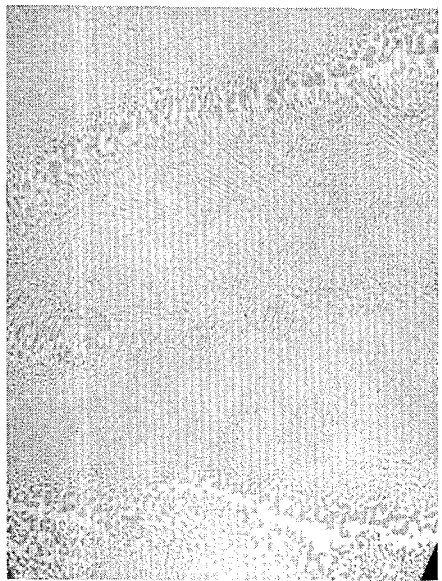
FIG. 7  As-Cast Transverse Section of $CaF_2$-LiF-NaF (200X)
FIG. 8  Unidirectionally Solidified Transverse Section of $CaF_2$-LiF-NaF (200X)
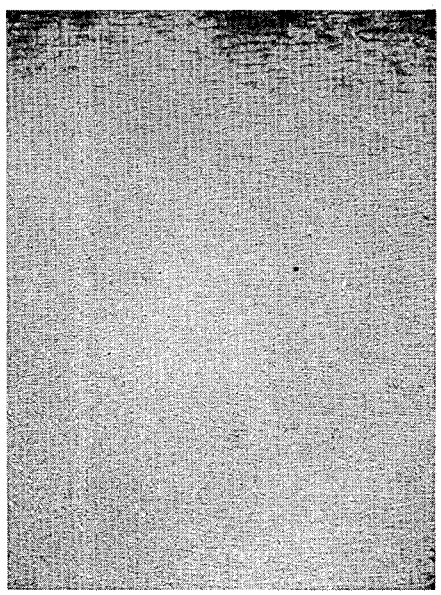

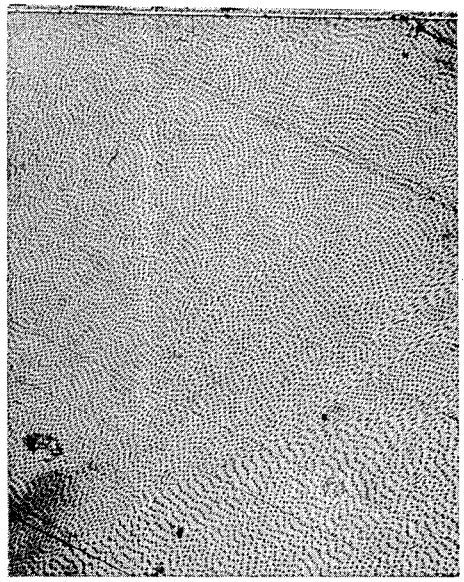
FIG. 9 Unidirectionally Solidified Longitudinal Section of $CaF_2$-LiF-NaF (200X)

TO POTENTIOMETER

United States Patent Office 3,505,218
Patented Apr. 7, 1970

3,505,218
MULTIPHASE NON-METALLIC COMPOSITIONS
OF MATTER
William R. Lasko, 79 Granite Road, Glastonbury, Conn.
06033, and Monte C. Nichols, 1733 E. Silver, Tucson,
Ariz. 87716
Continuation-in-part of application Ser. No. 637,004,
May 8, 1967. This application June 28, 1968, Ser.
No. 747,416
Int. Cl. C09k 3/00; G02b 1/00; B01i 17/00
U.S. Cl. 252—1
16 Claims

ABSTRACT OF THE DISCLOSURE

A solid, polyphase composition of matter comprising a eutectic mixture of inorganic compounds is provided, the composition of the mixture being such that the components thereof are reciprocally soluble in the liquid state, but freeze simultaneously at a constant temperature into at least two different solid phases upon cooling from the liquid state, the composition having a microstructure of eutectic composition containing at least two solid phases, at least one of said phases being in the form of an aligned, three-dimensional crystallites which are substantially parallel to a common direction. Additional compositions of eutectic mixtures comprising an inorganic compound and a member selected from the group consisting of water, an element and mixtures thereof are also provided. Such compositions, depending on the orientation relationships between the phases, are useful as components in either optical or electromagnetic devices.

Furthermore, an improved method of forming a solid, polyphase composition of matter comprising a eutectic mixture of the above-identified components is provided in which the improvement resides in employing said components.

CROSS-REFERENCES TO RELATED APPLICATIONS

This application is a continuation-in-part of U.S. application Ser. No. 637,004, filed May 8, 1967, and now abandoned which in turn is a continuation of U.S. application Ser. No. 350,510, filed May 9, 1964, now abandoned.

BACKGROUND OF THE INVENTION

Generally stated, the subject matter of the present invention relates to new and useful polyphase eutectic mixtures of inorganic compounds in which the phases have a fixed crystallographic relationship to one another, and to methods for producing such polyphase systems.

Objects of the present invention are new polyphase eutectic mixtures of metal salts, metal oxides, or combinations of metal salts and metal oxides having microstructures in which one or more of the phases is present in the form of very thin three-dimensional lamellae or crystallites which are parallel or substantially parallel to a given direction.

A further object of the present invention is a method of producing such polyphase eutectic mixtures of inorganic compounds.

Additional objects and advantages of the invention will be set forth in part in the description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose as embodied and broadly described, the present invention relates to a solid, polyphase composition of matter comprising a eutectic mixture of inorganic compounds, in which the cation moiety of said compounds is a metal selected from the group consisting of Group 1A, 1B, 2A, 2B, 3A, 3B, 4A, 4B, 5A, 6A, 6B and 8 metals of the Periodic Table of Elements, and the anion moiety of said compounds is a member selected from the group consisting of oxides, halides, sulfides, carbonates, chromates, nitrates, nitrites, sulfites, silicates, phosphates, zirconates, zirconites, titanates, tungstates, sulfates, and lanthanates; the composition of the mixture being such that the components thereof are reciprocally soluble in the liquid state, but freeze simultaneously at a constant temperature into at least two different solid phases upon cooling from the liquid state, the composition having a microstructure of eutectic composition containing at least two solid phases, at least one of said phases being in the form of an aligned, three-dimensional crystallites which are substantially parallel to a common direction.

The present invention further provides a method of forming the solid, polyphase composition of matter hereinabove described which comprises the steps of establishing a eutectic mixture, heating the mixture to a temperature above the eutectic temperature to melt a portion thereof throughout its entire cross-sectional area and to establish a liquid-solid interface, undirectionally solidifying at the liquid-solid interface by moving the interface in a direction such as to give the desired lamellae orientation, subjecting the interface to a cooling medium while the interface is moving in said direction to thereby simultaneously solidify at the interface at least two separate eutectic phases, and causing at least one of the eutectic phases to grow in the form of three-dimensional crystallites which are normal to the liquid-solid interface and parallel to the growth direction by regulating the solidification rate and the thermal gradient of the liquid at the liquid-solid interface so that the ratio of the thermal gradient in the liquid phase at the solid-liquid interface to the solidification rate is between about 0.1 and 1000° $C/cm.^2/hr.$, the improvement wherein the eutectic mixture comprises inorganic compounds, as hereinabove described.

The invention consists of the novel methods, processes, steps and improvements shown and described.

According to one embodiment of the present invention, polyphase eutectic mixtures of inorganic compounds have been produced having microstructures which consist predominantly of very fine, three-dimensional phase lamellae or crystallites which may be characterized as plates or rods, of one phase imbedded in another phase, said lamellae or crystallites being substantially parallel to a common direction.

Such polyphase products are produced by establishing a liquid-solid interface in a multiphase eutectic mixture of inorganic compounds, and causing the interface to be moved in a unidirectional fashion while simultaneously cooling the interface through an appropriate transformation temperature. In this way, three-dimensional crystallites of each phase of the eutectic grow or form normal or approximately normal to the interface or solidification front between the transformed and untransformed eutectic mixture and parallel to the growth direction over great distances, e.g., up to 1 or 2 inches, or 1 or 2 feet, or even 1 or 2 meters, or even longer. Further, the parallel microstructure extends throughout substantial volumes of the uni-directionally solidified product.

When the lamellae formed are three-dimensional plates or platelets, these may be substantially parallel to one another, as well as parallel or substantially parallel to the growth direction throughout the entire volume of the specimen.

The three-dimensionl plate-like lamellae, however, need not be and frequently are not parallel to one another throughout the entire volume of the composition.

Thus, for example, the plates or platelets in one volumetric section of the composition may form an angle with the plates or platelets in an adjoining volumetric section of the composition. The plates or platelets from section to section of the composition are, however, parallel to a common direction, even through, from section to section, the plates or platelets may not be substantially parallel to each other. This phenomenon will be desribed more fully hereinbelow in connection with the drawings.

When the lamellae formed are rods, these are substantially parallel to each other over the entire specimen, as well as substantially parallel to a common direction.

Regardless of whether rod-like or plate-like lamellae are formed, the lamellae in the microstructure of the products described herein extend in a direction which is normal to or substantially normal to the solidification front.

In the solid compositions of this invention, the microstructures are comprised of a eutectic mixture of inorganic compounds. The inorganic mixtures are such that the inorganic components thereof are reciprocally soluble in the liquid state. Upon cooling, the mixtures from the liquid state, however, two (or more) different types of inorganic crystals (hereinafter sometimes called phases) freeze simultaneously at a fixed temperature, called the eutectic temperature. Examples of eutectic mixtures which may be used to form the products of the present invention are cited for illustrative purposes in Table I.

pounds of the type described are within the purview of this invention, wherein the chemical element is a member selected from the group consisting of Group 1A, 1B, 2A, 2B, 3A, 3B, 4A, 4B, 5A, 5B, 6A, 6B, and 8 elements of the Periodic Table of Elements. As employed in the instant specification and claims the Periodic Table of Elements shall be defined to be according to Mendeleef as set forth in the Hadnbook of Chemistry and Physics, 46 Edit., 1965–1966, published by The Chemical Rubber Co., which table is incorporated by reference as part of the present specification.

The eutectic compositions suitable for use herein are preferably those selected from that class of inorganic eutectic mixtures which can be controlled by appropriate, preferably solidification techniques, to give a microstructure which consists of fine three-dimensional crystallites, e.g., plates or rods, of one of the phases imbedded in another or second phase, sometimes referred to as the matrix.

With such eutectics, the crystallites (e.g., plates or rods) together with the matrix are referred to as the groundmass and the groundmass is of eutectic composition.

With other eutectics suitable for use herein, if one of the phases is forced to grow as parallel plate-like crystallites, the other phase may grow in the same manner. In products made from such eutectics, the parallel phase lamellae may be referred to as the groundmass of the compositions. Here again, the groundmass of such products is of eutectic composition.

Eutectic mixtures of inorganic salts and/or oxides having the above described characteristics, i.e., the ability of at least one of the eutectic phases to solidify in the form of three-dimensional plate-like or rod-like crystallites, are referred to in the art as "normal" eutectics, and

TABLE I

| Groups | Specific Eutectics |
| --- | --- |
| Metal chlorides | KCL-LiCl, $MgCl_2$-KCl. |
| Metal oxides | $Al_2O_3$-$TiO_2$, PbO-$WO_3$, $BaFe_{12}O_{19}$-$BaFe_2O_4$. |
| Metal sulfides | FeO-FeS, CoO-FoS. |
| Metal carbonates | $Li_2CO_3$-$CaCO_3$, $Li_2CO_3$-$Na_2CO_3$. |
| Metal fluorides | NaF-$CaF_2$, NaF-$CaF_2$-LiF. |
| Metal bromides | $CdBr_2$-$PbBr_2$, $CdBr_2$-$ZnBr_2$. |
| Metal iodides | NaI-$HgI_2$, KI-$HgI_2$, AgI-NaI. |
| Metal nitrates | $Ca(NO_3)_2$-$KNO_3$, $Ca(NO_3)_2$-$NaNO_3$. |
| Metal nitrites | $KNO_2$-$NaNO_4$. |
| Metal sulfates | $K_2SO_4$-$Na_2SO_4$. |
| Metal silicates | $CaSiO_3$-$Li_2SiO_3$. |
| Metal phosphates | $Na_2O$-$P_2O_5$, CaO-$P_2O_5$. |
| Metal lanthanates | $La_2O_3$-$ZrO_2$. |
| Metal titanates | $K_2TiO_3$-$K_2CrO_4$, $Na_2TiO_3$-$Na_2SO_4$. |
| Metal tungstates | $K_2(WO_4)_2$-$K_4P_2O_7$, $Na_4P_2O_7$-$Na_2WO_4$. |
| Metal zirconates | $TiO_2$-$ZrO_2$, BaO-$ZrO_2$. |
| Mixed metal halide salts | LiCl-LiF, LiBr-LiF, $CaF_2$-LiF-NaF. |
| Metal fluoride salts and metal oxides | $CaF_2$-CaO, $PbF_2$-PbO. |
| Combination systems | LiCl-$Li_2CO_3$, NaBr-$Na_2O$-$SO_3$, $PbBr_2$-PbO, KCl-$K_2CrO_4$, BaO-$B_2O_3$-$SiO_2$, CaO-$B_2O_3$-$SiO_2$, SrO-$B_2O_3$-$SiO_2$. |

It should be understood that the eutectic systems given in the table are intended to be merely illustrative and not limiting.

It will be noted from the table that the compositions include eutectic mixtures of inorganic compounds, e.g., inorganic metal salt, inorganic metal oxide, or a mixture of salts and oxides. Among the metal salts may be mentioned the halides, sulfides, carbonates, chromates, nitrates, nitrites, sulfites, silicates, phosphates, zirconites, titanates, tungstates, sulfates, lanthanates, and the like.

Eutectic mixtures comprising water as a component, as well as elements, in combination with inorganic comare suitable for the preparation of the new and useful class of materials of the present invention.

In Table II, typical normal eutectics comprising inorganic metal salts are classified in accordance with their "as cast" structure.

TABLE II.—AS CAST STRUCTURE OF NON-METALLIC EUTECTICS

| System [A-B] | Composition, mole percent A | Eutectic temp.,° C. | As cast structure |
| --- | --- | --- | --- |
| NaF-$CaF_2$ | ~67 | ~810 | Normal. |
| NaF-LiF | ~40 | ~652 | Normal-plates. |
| NaF-$MgF_2$ | ~77 | ~820 | Do. |
| NaF-PbF | ~32 | ~540 | Normal-rods (NaF). |
| PbO-$PbMoO_4$ | ~65 | ~740 | Normal-rods (probably $PbMoO_4$). |

The mixtures used as a starting material to make the new and useful products of the present invention may be of true eutectic composition, or may deviate from true eutectic composition. In either event, the parallel lamellate groundmass will be of eutectic composition.

When the starting admixture deviates from true eutectic composition, the products will still have a parallel lamellar groundmass or microstructure of eutectic composition. However, in this embodiment, relatively large-non-eutectic crystals of one of the compounds are distributed throughout the parallel lamellar eutectic groundmass or microstructure. These relatively large non-eutectic crystals will be referred to hereinafter as proeutectic crystals.

Mixtures deviating from true eutectic composition may be considered to comprise a eutectic portion, i.e., a portion which undergoes a eutectic reaction as this term is defined hereinabove, and a proeutectic portion, i.e., a portion which does not undergo a eutectic reaction. When such a mixture is used as starting material, the resulting product will comprise a parallel lamellar eutectic groundmass or microstructure having distributed therein relatively large proeutectic crystals. The distribution of the proeutectic crystals throughout the parallel lamellae eutectic groundmass may be random or uniform.

For best results, the starting admixture used to form the product of this invention should be eutectic or substantially eutectic in composition.

The invention will be described with reference to the accompanying drawings, in which:

FIGURE 1 is a photomicrograph (200×) of transverse section of an "as cast" microspecimen of the LiF—NaF eutectic of Table II;

FIGURES 2 and 3 are photomicrographs (200×) of transverse and longitudinal sections, respectively, of the same LiF—NaF eutectic, but unidirectionally solidified in accordance with this invention;

FIGURE 4 is a photomicrograph (200×) of a transverse section of an "as cast" microspecimen of the NaF—$PbF_2$ eutectic of Table II;

FIGURES 5 and 6 are photomicrographs (200×) of transverse and longitudinal sections, respectively, of the same NaF—$PbF_2$ eutectic, but unidirectionally solidified in accordance with this invention;

FIGURE 7 is a photomicrograph (200×) of a transverse section of an "as cast" microspecimen of the ternary eutectic $CaF_2$—LiF—NaF;

FIGURES 8 and 9 are photomicrographs (200×) of transverse and longitudinal sections, respectively, of the same $CaF_2$—LiF—NaF eutectic, but unidirectionally solidified in accordance with this invention;

FIGURE 13 is a schematic diagram of an apparatus which may be used in making the structures of the present invention;

Figure 15:
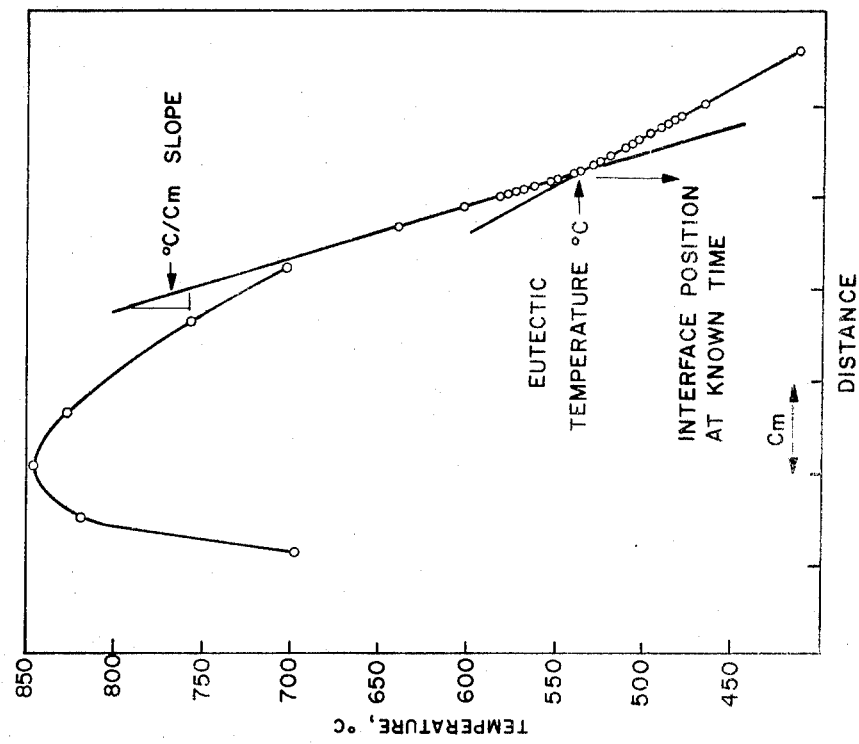
Figure 12:
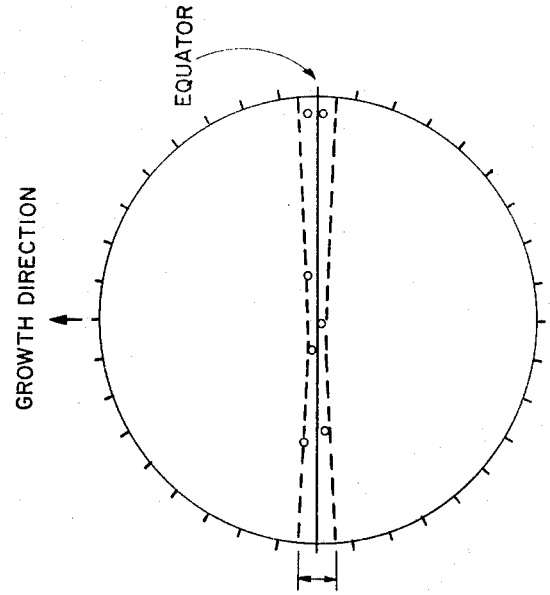
FIGURE 12 is a stereographic projection of lamellar normals of various sections of a microspecimen of the type shown in FIGURES 2 and 3. Growth direction on this projection is vertical, and the plane of projection is a longitudinal section.
Figures 13, 14A, 14B:
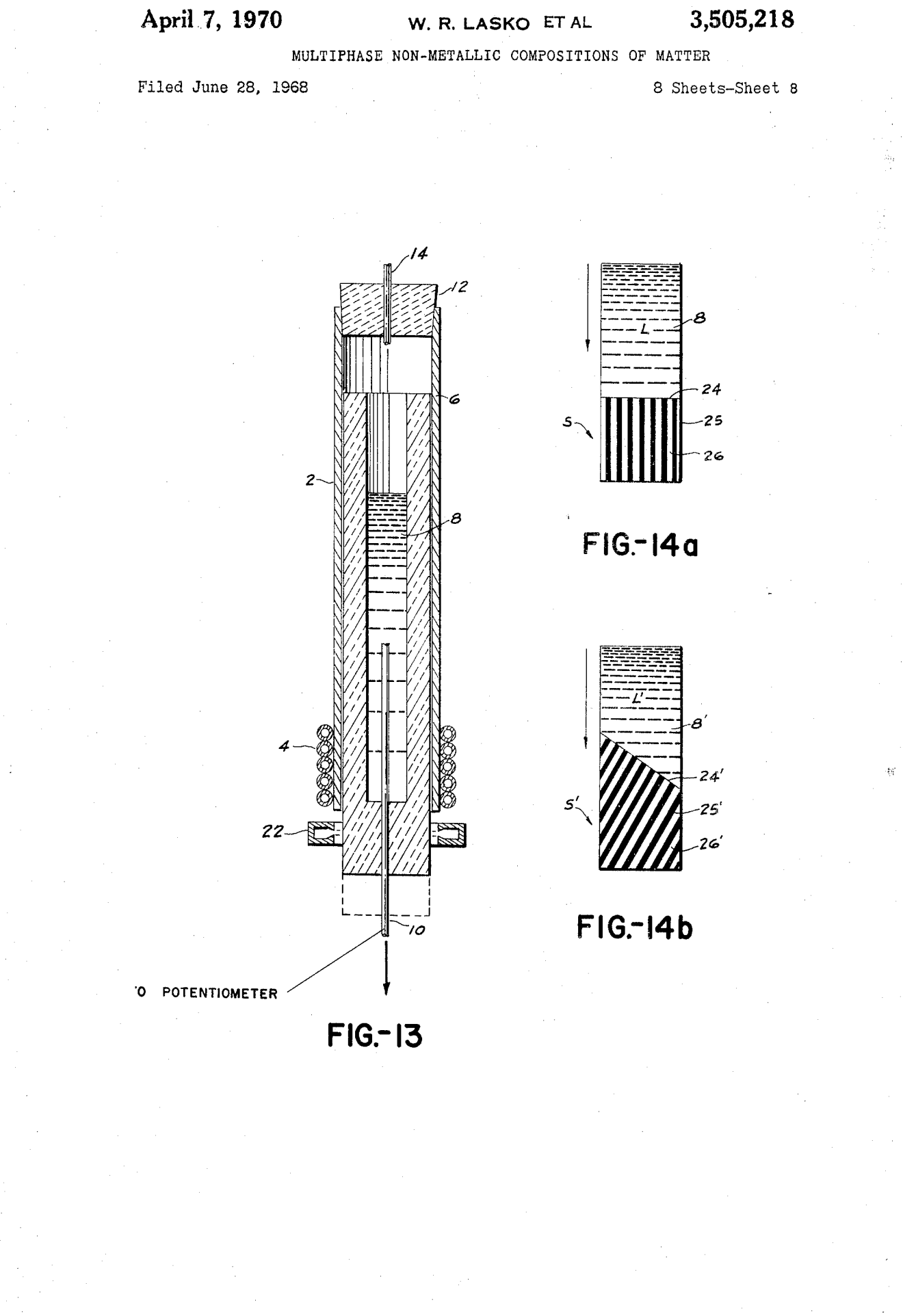

FIGURES 14(a) and 14(b) are schematic diagrams of specimens undergoing unidirectional solidification; and FIGURE 15 is a typical plot of temperature versus time for a specimen undergoing unidirectional solidification.

As is apparent from FIGURES 2, 3, 5, 6, 8 and 9, the microstructures of the polyphase systems of the present invention comprise thin lamellae or crystallites of one eutectic phase which are specifically oriented with respect to thin lamellae or crystallites of other eutectic phases.

FIGURES 1–3 are photomicrographs of the NaF—LiF eutectic.

Transverse and longitudinal sections of the same NaF—LiF microspecimen unidirectionally solified in accordance with this invention are shown in FIGURES 2 and 3, respectively.

As shown in FIGURES 2 and 3, the thin lamellae of each phase are three-dimensional plate-like in appearance, and within volumetric sections, all of the lamellae of one phase of the NaF—LiF eutectic are parallel or substantially parallel to one another and therefore also parallel or substantially parallel to the lamellae of the other phase.

The "as cast" LiF—NaF eutectic is shown in FIGURE 1 for comparison with FIGURES 2 and 3. Note in FIGURE 1 that the phases are randomly oriented with respect to each other.

FIGURES 4, 5 and 6 are photomicrographs of the NaF—PbF eutectic identified in Table II. Transverse and longitudinal sections of a specimen unidirectionally formed in accordance with this invention are shown in FIGURES 5 and 6. As shown by FIGURES 5 and 6, the lamellae of each eutectic phase are three-dimensional, rod-like crystallites, which are parallel to each other. The "as cast" NaF—$PbF_2$ eutectic is shown in FIGURE 4 for comparison purposes. Note in FIGURE 4 that the orientation of the phases of the "as cast" structure is random with respect to each other.

FIGURES 7, 8 and 9, are photomicrographs of the ternary eutectic $CaF_2$—LiF—NaF. The unidirectionally solidified specimen shown in FIGURES 8 and 9 reveals parallel NaF rods in a LiF and $CaF_2$ matrix. As shown by FIGURE 7, the orientation of the phases of the "as cast" material is quite random.

Figure 10:
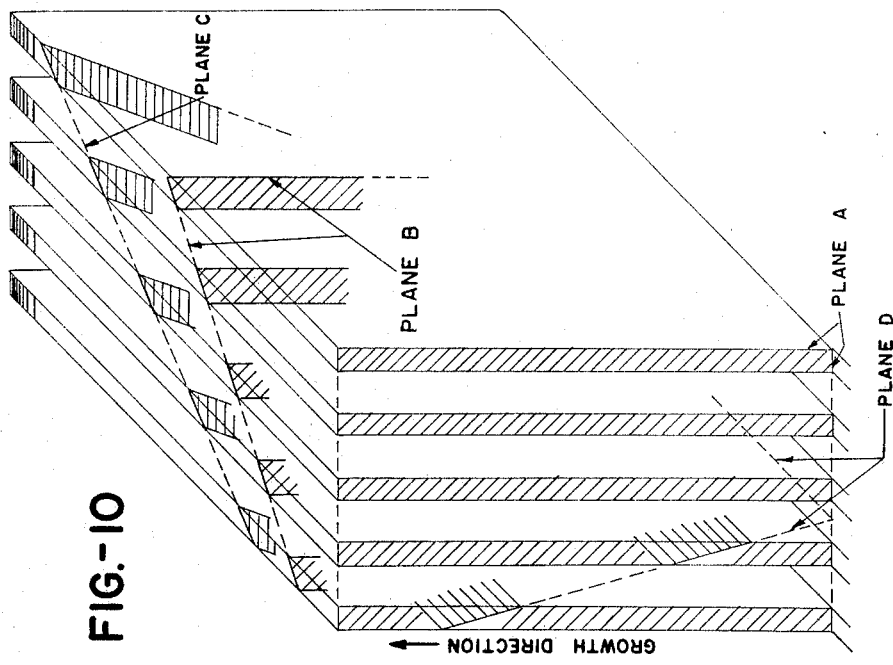
FIGURE 10 is a schematic sketch illustrating dependence of lamellar appearance upon the plane of sectioning of a specimen exhibiting plate-like lamellae.

FIGURES 10 is a schematic illustration of the microstructure achieved by this invention and is intended to bring out the three-dimensional nature of the lamellae of the unidirectionally solidified polyphase eutectic mixtures of the inorganic compounds.

Figure 11:
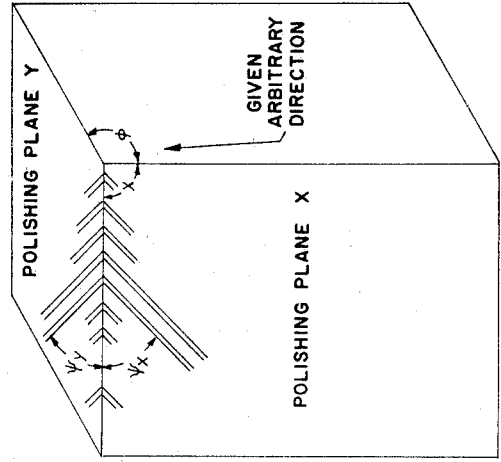
FIGURE 11 is a sketch showing measurements which may be taken to determine the lamellar orientation of a specimen exhibiting plate-like lamellae.

It will be noticed in FIGURE 10 that the appearance of a series of parallel plates depends very strongly upon the particular polishing plane taken through the specimen. If the plane of the microspecimen is not quite parallel to the growth direction as in planes C and D of FIGURE 10, and/or depending upon how the lamellae happened to grow in a particular section relative to the plane of the microspecimen, all sorts of lamellar structures will be observed. The true orientation of the plates in any section can only be obtained by measuring the angles at which the plates intersect two intersecting planes, as is brought out in FIGURE 11. The angle between the planes, $\phi$, and the angle $\lambda$ between a given arbitrary direction in one of the planes and the intersection of the two measuring planes must also be known. From these measurements the direction of the plane normals can be determined most easily by means of a stereographic projection. If the lamellae grow into the liquid, the lamellae normals should all lie on the equator of a stereographic projection, the plane of which is a longitudinal section and the axis of which is the growth direction. The results of a stereographic analysis of the sections of the specimen shown in FIGURES 2 and 3, for instance, as well as other sections, confirm, within the limits of experimental error, the fact that the lamellae do grow into the liquid parallel to the growth direction in spite of the rather odd way they sometimes appear in particular microspecimens.

In any event it has been established that when the microstructure of a unidirectionally solidified inorganic eutectic mixture displays plate-like lamellae, e.g., the NaF—LiF eutectics of FIGURES 2–3, these lamellae are parallel or substantially parallel to each other within sections of the specimen, and the lamallae from section to section of the specimen are parallel or substantially parallel to the growth direction.

When the microstructure of a unidirectionally solidified eutectic mixture of inorganic compounds comprises rod-like lamellae of one phase imbedded in another or second phase, e.g., the NaF—$MgF_2$ eutectic of FIGURES 5–6, these rod-like lamellae will be parallel or substantially parallel to each other throughout the specimen, and also parallel to the growth direction.

The unique microstructure of the unidirectionally solidified inorganic eutectic mixtures of the present invention lead to unique physical properties.

The properties of the controlled composite crystals may be isotropic or anisotropic depending on the orientation relationships between the two phases and the nature of each phase. Inorganic eutectic mixtures with an ordered phase are frequently transparent and therefore useful as components in either optical or electromagnetic devices. In optics, certain of the unidirectionally solidified inorganic eutectic mixtures find utility as diffraction grantings, prisms, and high temperature lenses. Because of their unique microstructural regularity, other properties (viz. heat conductivity, ductility, adsorption, etc.) of the inorganic eutectic mixtures can also be put to good use. For example, the instant procedures and compositions can be used to produce a "structural" ceramic as well as to fabricate substrates for micromodules to insure good heat conductivity.

The microstructures of the unidirectionally solidified eutectic mixtures may be characterized in terms of the parallelism of the lamellae, i.e., plates or rods, making up the microstructure, and also in terms of the size and shape of the lamellae.

In terms of physical dimensions, when the lamellae are three-dimensional plate-like crystallites, these are extremely thin and have a thickness of about 0.02 to about 20 microns, and usually between about 0.04 and 10 microns. The width of the plate is at least three times the thickness and is generally greater than ten times the thickness. The length of the lamellae is generally greater than the width, and may vary from about 50 microns to 1 or 2 inches or more.

As has been noted hereinabove, these plate-like lamellae are arranged within the specimen so as to be substantially parallel to one another over appreciable distances within a section; and between sections, the plate-like lamellae are substantially parallel to the common growth direction, which, as has been pointed out, is frequently parallel to the solidification direction, but which may be artificially inclined at an angle, depending upon the application.

When the lamallae are rods, these have a diameter of about 0.02 to 20 microns, usually between about 0.02 to 10 microns, and a length which is greater than the diameter, generally greater than 50 microns, and usually between about 100 microns and 1 to 2 inches. These crystallites in the form of rods are substantially parallel to each other and to the common growth direction throughout the entire specimen.

The parallelism of the phase of the inorganic eutectic mixtures may be described by stereographic projection, which is a technique used to describe angles and direction in three dimensions on a two-dimensional sheet of paper. The theory of stereographic projection is described in many standard works on geometry and trigonometry.

Briefly, in stereographic projection, planes, axes and angles are conveniently represented on a sphere. The crystal or origin of all planes, axes and angles is assumed to be very small compared with the sphere (known variously as the reference sphere or polar sphere) and to be located exactly at the center of the sphere. Planes of the crystal, or in the present instance, the lamellae in the microstructure of the inorganic eutectic, can be represented by extending the lamallae until they intersect the sphere in a great circle. The normals to plate-like lamellae can alternately be used. The microspecimen is assumed to be so small that all lamellae pass through the center of the sphere. If all planes of the crystal, or in this instance, if all of the lamellae of each phase are projected upon the sphere in this manner, it will be found that the axes of the rod-like lamellae or normals to the plate-like lamellae bear the same reaction to each other as do the lamellae within the microstructure of the eutectic and so exhibit, without distortion, the angular relation of the lamellae within the microstructure.

The parallelism of the lamellae in the microstructure may be designated by a concept called spherical excess, using the method of stereographic projection.

If the lamallae within the microstructure are perfectly parallel, all of the projections of these lamellae (axes for rods, normals for plates) will intersect the sphere at two diametrically opposite points. The stereographic projections of lamallae having this relationship are assigned a spherical excess of 0 percent.

If the arrangement of the lamellae is completely random, the projections will occur in diametrically opposite pairs all over the surface of the spheres. The stereographic projections of such lamellae are said to have a spherical excess of 100 percent.

If, however, the lamellae within the microstructure are not completely parallel, but nearly so, the projections of the lamellae (axes for rods, normals for plates) will intersect the surface of the sphere over a small angular range. Because the projection lines always intersect the sphere at two diametrically opposite points, two diametrically opposite and equal small angular ranges will occur but it is only necessary to consider one of them. The projections of the lamellae in the microstructure, accordingly, are said to have a spherical excess, which is expressed by the percentage of the surface of the hemisphere bounded by the curves connecting the points on the surface of the sphere which extend from the described projections of the lamellae of the microstructure.

The theory of stereographic projection and the concept of spherical excess may be applied to determine the arrangement of the lamellae in the microstructures of the products of the present invention.

When the microstructure of the unidirectionally solidified mixtures of inorganic compounds comprise rods, or rod-like crystallites, the rods are parallel or substantially parallel to each other and to a given direction, e.g., the growth direction, over the entire specimen.

For inorganic eutectic mixtures having rod-like microstructures, the spherical excess of the stereographic projection of the rods varies within the range of from about 0 to 20 percent, rarely over 10 percent, and usually from 0 to 5 percent.

Stereographic projection has also been used to measure the orientation of the lamellae of the unidirectionally solidified eutectics of the present invention having microstructures comprising plate-like lamellae.

Within sections of the specimen (see FIGURES 2–3), the spherical excess of the stereographic projection of lamellae has been found to be from about 0 to 20 percent, rarely over 10 percent, and usually from about 0 to 5 percent.

When plate-like microstructures exist, the term section or volumetric section refers to a volume of the specimen in which the plate-like lamellae are parallel or substantially parallel to the lamellae of the other phase of, for example, a two phase system.

For inorganic microstructures comprising plate-like lamellae, the orientation of the plate-like lamellae from section to section is determined by stereographic projection of the lamellae normals, with respect to the growth direction. When the growth direction on the projection is vertical, and using a longitudinal section of the microspecimen, the stereographic projections of the plate-like lamella normals deviate from the equator by less than 30°, rarely over 20°, and usually under 5°. This means that the plate-like lamellae deviate from being parallel to the growth direction by the indicated degrees.

FIGURE 1, as brought out above, is a photomicrograph of a transverse section of the LiF—NaF eutectic "as cast." The same eutectic was used in making the specimen shown in FIGURES 2–3. Comparing FIGURE 1 with FIGURES 2–3, it is obvious that the microstructures are radically different. Thus, in FIGURE 1, crystal growth started at many points and grew outward in all directions within the liquid, and a random, overall structure was produced. The orientation of the lamellae as is shown in FIGURE 1 varies from area to area. In terms of spherical excess, the stereographic projections of the lamellae in the specimen whose microstructure is shown in FIGURE 1 would have a spherical excess approaching 100 percent, i.e., completely random. For comparison the stereographic projections of the lamellae in FIGURES 2–3 would have a spherical excess, within volumetric sections, of less than 5 percent. A similar analysis applies to FIGURES 4–6 and FIGURES 7–9, respectively.

The method of unidirectionally solidifying eutectic mixtures of inorganic compounds will be described in connection with FIGURES 13, 14(a), 14(b) and 15.

As shown in FIGURE 13, a typical apparatus comprises a hollow, tubular induction furnace 2 having heating coils 4 suitably attached to a power source, now shown. Slideably mounted within the induction furnace is a crucible 6, which holds the eutectic mixture 8. Projecting upwardly through the bottom of the crucible and into the specimen is a thermocouple 10.

The induction furnace may, if desired, be equipped with a closure member 12 which is fitted with a tube 14, through which may be admitted an inert bleed gas, such as argon, krypton, neon and so forth.

Crucible 6 is fitted with a suitable drive mechanism (not shown) to pull the crucible through the furnace. The drive mechanism is readily adjustable to change the rate at which the crucible is drawn through the induction furnace.

Spaced below the induction furnace and surrounding the crucible is cooler 22 through which a suitable cooling fluid is passed and projected or sprayed upon the surface of the crucible as it passes therethrough.

The following examples describe methods of unidirectionally solidifying eutectic mixtures of inorganic compounds. Though illustrative, it should be understood that the invention is not limited to the specific method or apparatus described, but is broad enough to encompass all methods and apparatus which will be obvious to those skilled in the art from the description herein.

Example I.—Preparation of a binary eutectic composition of NaF and LiF

This example demonstrates the preparation of a primary eutectic composition comprising NaF and LiF.

The system used is a eutectic composition comprising 40 percent NaF and 60 percent LiF (mole percent). The "as cast" solid was prepared by heating an intimate mixture of the two materials in a platinum crucible at 700° C. in a Temco furnace and raising the temperature to 800° C., removing the contents, and cooling in air.

The structure of the resulting solidified eutectic mixture before controlled solidification is shown in FIGURE 1. The individual phases can be readily distinguished when the specimen has been suitably polished and etched. It can also be observed from the micrograph, FIGURE 1, that the orientation of the two phases is quite random with respect one to the other, although some preferred orientation exists over small areas. The system, as is, thus acts as an aggregation of randomly oriented crystallites or colonies.

The "as cast" material was then placed in a graphite boat in a friction drive trolley furnace with a nichrome heating element. The sample was melted initially in sections and then with the furnace moving at about 3 cm./hr. with argon flow and at a temperature of 800° C. Three passes of the heat zone were made across the specimen. Photomicrographs of the microstructure of the controlled sample are shown in FIGURES 2–3. As shown in FIGURES 2–3, the two phases of the unidirectionally solidified microstructure present a fixed relationship to one another. In addition to having a fixed crystallographic orientation, the phases occur as alternating lamellae on the order of a few microns in thickness.

Example II.—Preparation of a binary eutectic composition of $PbF_2$ and NaF

This example demonstrates the preparation of a binary eutectic composition of $PbF_2$ and NaF.

The system used is a eutectic of 68 percent $PbF_2$ and 32 percent NaF (mole percent). The "as cast" material was prepared as described in Example 1. The Temco furnace temperature, in this case, however, was maintained at 650° C. for 1 hour. The structure of the "as cast" material is shown in FIGURE 4. Normal colony structure with NaF rods is indicated.

Using the procedure of Example 1, this eutectic system was unidirectionally solidified under argon in a graphite boat at about 1 cm./hr. and at a maximum temperature of about 780° C. The controlled structure, as shown in FIGURES 5–6, consists of NaF rods in a $PbF_2$ matrix. The NaF rods appear reasonably well aligned.

Example III.—Preparation of a ternary eutectic composition of $CaF_2$, NaF and LiF This example demonstrates the preparation of a ternary eutectic composition of $CaF_2$, NaF and LiF.

The ternary system ($CaF_2$—NaF—LiF) illustrates the applicability of the invention to the more complex three-component eutectic systems. This system has a eutectic at 10 percent $CaF_2$, 36.5 percent NaF and 53.5 percent LiF (mole percent).

The "as cast" melt was prepared by heating at 1800° C. and cooling in air. The microstructure, "as cast," shown in FIGURE 7, reveals NaF rods in a LiF and $CaF_2$ matrix. The "as cast" material was placed in a graphite boat and melted in the zone melter described in Example 1. The material was zone passed twice at about 4–5 cm./hr. to mix the components. The material was then controlled at 2.7 cm./hr. at about 850° C. Transverse and longitudinal sections of the controlled structure are shown in FIGURES 8–9, respectively.

In carrying out the examples, the apparatus of FIGURE 13 may readily be used. For instance, the induction furnace 2 may consist of an outer tube, e.g., Vycor, fitted at its bottom with an RF induction load coil. A crucible, e.g., graphite, drilled to hold the specimen, may be slideably mounted in the outer tube. The crucible may then be drawn through the furnace in the direction of the arrow shown in FIGURE 13 by a suitable drive mechanism (not shown).

After charging the apparatus with the specimen, power to the induction coil is turned on, and water fed to the quenching fixture. An inert gas, e.g., argon, can then be fed to the tube, as shown in the drawing, to minimize the oxidation of the melt. The heat input of the induction coils and the temperature and rate of water flow to the quenching fixture or water cooler should be regulated to produce a solid-liquid interface in the specimen which extends across the entire cross-sectional area of the specimen in a direction substantially transverse to the direction of motion of the graphite crucible.

The drive mechanism for the crucible may then be turned on, and the crucible drawn through the Vycor tube at the predetermined rate.

Temperature gradients in the liquid and the location of the liquid-solid interface may be determined by recording and plotting the temperature of a thermocouple bead as a function of the distance that the crucible has travelled.

The temperature of the liquid and the thermal gradient at the interface are controlled by appropriately adjusting the power input to the induction coil, the quantity of water used, and the rate of unidirectional movement of the crucible.

FIGURE 14 is a schematic diagram of a typical specimen being subjected to unidirectional solidification. As is shown in FIGURE 14, the solid-liquid interface 24 extends across the cross-sectional area of the specimen, and in a direction transverse to the unidirectional movement of the specimen in this example.

The thermal gradient, G, in the liquid at the liquid-solid interface, was determined by recording and plotting the temperature of a thermocouple bead as a function of the distance that the movable part of the apparatus had travelled. A typical curve of this type is shown in FIGURE 15. The temperature gradient, in the liquid, immediately in front of the interface, as determined by the slope of the curve, is in ° C./cm.

The rate of solidification, R, is determined from the number of centimeters of solidified alloy formed, and the time required for formation. The solidification rate is expressed as cm./hr.

In preparing the controlled non-metallic eutectics of the present invention having substantially parallel lamellae, it is important to control the thermal gradient (G) in the liquid at the interface and the solidification rate (R) during the unidirectional solidification.

The thermal gradient in the liquid is defined as the change in temperature in the liquid per centimeter of length in the liquid phase immediately in front of the advancing interface. As the liquid eutectic is cooled, it will be appreciated that the temperature will change from that of the eutectic at its melting point, or above, i.e., when the melt is superheated, to that of the solidified eutectic. The thermal gradient is measured in accordance with the method described hereinabove.

As is shown in FIGURE 14(a), the specimen as it is being subjected to unidirectional solidification, contains a solid-liquid interface 24, the specimen below the interface being solid, as indicated at S, and above the interface being liquid, as indicated at L. As the specimen is pulled downwardly through an apparatus of the type shown in FIGURE 13, the interface will gradually move towards the top of the specimen. At commencement of operation, of course, the liquid phase can extend to the bottom of the specimen. The lamellae of the phases, as indicated schematically at 25 and 26 of FIGURE 14(a) grow normal to the interface 24, and also parallel to the direction indicated by the arrow in FIGURE 14(a), this direction in this instance corresponding to the solidification direction.

It is not, however, necessary that unidirectional forming commence at the bottom of the specimen, nor need it be carried out over the whole length of the specimen. Nor is it necessary that the entire specimen be liquid above the interface. It is simply necessary that a solid-liquid interface be established, and that the solidification be controlled at said interface.

Although the direction of solidification has been described to be vertical, it should be understood that the solidification may be carried out in any direction desired. Thus, for example, the solidification direction may be horizontal, or may form any angle with the vertical. Practical considerations may warrant the unidirectional solidification being carried out over only a portion of the specimen. In this event, those portions of the specimen not subjected to unidirectional solidification may be cut away from the portion that has undergone unidirectional solidification, if desired.

In any event, it will be apparent that the temperature of the liquid phase will vary with distance. This variation is called the thermal gradient, and is measured in ° C./cm. So far as the present invention is concerned, it is the thermal gradient in the liquid at the liquid-solid interface, e.g., 24 in FIGURE 14(a) that is important.

Interface 24 in FIGURE 14(a) is referred to as the crystallization front, and it is at this interface that the plate-like or rod-like lamellae form. The crystallization front may be transverse to the net or overall solidification direction, as shown in FIGURE 14(a), or it may form other angles with the solidification direction. Usually, however, the crystallization front will be transverse to the solidification direction.

In FIGURE 14(b), for example, the interface 24' is shown to form an angle with the net or overall solidification direction. The lamellae 25' and 26', however, grow normal to the interface 24'. In FIGURE 14(b), of course, the lamellae 25' and 26' do not grow parallel to the solidification direction, which is indicated by the arrow. Rather, these lamellae are parallel to a direction which is normal to the solidification front 24'.

It will also be apparent that the liquid phase will solidify at a rate depending upon the temperature of the liquid, the rate of cooling, and the velocity of the specimen through the heating and cooling zones. The solidification rate, R, is measured in cm./hr.

The solidification rate and thermal gradient in the liquid at the liquid-solid interface undergoing solidification, i.e., the crystallization front, which are necessary to produce the lamellar microstructures described hereinabove, vary, depending upon the eutectic compositions being unidirectionally solidified. In general, it may be said that the solidification rate and the thermal gradient must be kept within a certain range, which range varies for each system whose microstructure is being controlled. The necessary solidification rate and thermal gradient will also depend to a certain extent on the impurities in the system.

The ratio of the thermal gradient, G, at the crystallization front to the solidification rate, R, is a good measure to assure formation of the parallel lamellae at the solid-liquid interface. In general, the ratio $G/R$ may vary from about 0.1 to 1000, and is preferably between about 1° to 300° C./cm.$^2$/hr. The optimum value, of course, depends to a large extent upon the physical and chemical composition of the system being subjected to unidirectional solidification.

Although the method of forming unidirectionally solidified eutectic mixtures of inorganic compounds has been described in connection with cylindrical specimens, it should be understood that the shape of the specimen is not critical, and that the method is equally applicable to specimens having various shapes, such as cubes, polygons, torroids and the like. Care must be taken in unidirectionally solidifying such specimens, however, to insure that the liquid-solid interface undergoing solidification is maintained perpendicular to the desired lamellae orientation.

What is claimed is:

1. As a new article of manufacture, an anisotropic polyphase solid characterized by a microstructure of eutectic composition which is a member selected from the group of inorganic compound containing eutectics consisting of: $KCL$—$LiCl$; $BaFe_{12}O_{19}$—$BaFe_2O_4$; $MgCl_2$—$KCl$; $Al_2O_3$—$TiO_2$; $PbO$—$WO_3$; $PbO$—$PbMoO_4$; $FeO$—$FeS$; $CoO$—$FeS$; $Li_2CO_3$—$CaCO_3$; $Li_2CO_3$—$Na_2CO_3$; $NaF$—$CaF_2$; $NaF$—$LiF$; $NaF$—$MgF_2$; $NaF$—$PbF_2$; $NaF$—$CaF_2$—$LiF$; $CdBr_2$; $CdBr_2$—$ZnBr_2$; $NaI$—$HgI_2$; $KI$—$HgI_2$; $AgI$—$NaI$; $Ca(NO_3)_2$—$KNO_3$; $Ca(NO_3)_2$—$NaNO_3$; $KNO_2$—$NaNO_2$; $K_2SO_4$; $CaSiO_3$—$Li_2SiO_3$; $Na_2O$—$P_2O_5$; $CaO$—$P_2O_5$; $La_2O_3$—$ZrO_2$; $K_2TiO_3$—$K_2CrO_4$; $Na_2TiO_3$—$Na_2SO_4$; $K_2(WO_4)_2$—$K_4P_2O_7$; $Na_4P_2O_7$—$Na_2WO_4$; $TiO_2$—$ZrO_2$; $BaO$—$ZrO_2$; $LiCl$—$LiF$; $LiBr$—$LiF$; $CaF_2$—$LiF$—$NaF$; $CaF_2$—$CaO$; $PbF_2$—$PbO$; $LiCl$—$Li_2CO_3$; $NaBr$—$Na_2O$—$SO_3$; $PbBr_2$—$PbO$; $KCl$—$K_2CrO_4$; $BaO$—$B_2O_3$—$SiO_2$; $CaO$—$B_2O_3$—$SiO_2$; $CaO$—$B_2O_3$—$SiO_2$; and $SrO$—$B_2O_3$—$SiO_2$; the components of said eutectic composition being reciprocally soluble in the liquid state; said eutectic composition being further characterized by the ability to simultaneously form at least two different solid phases at a constant temperature upon cooling from the liquid state;

said micro-structure of eutectic composition containing at least two solid phases, at least one of the phases being in the form of aligned, three-dimensional crystallites which are substantially parallel to a common direction over an extended distance.

2. The solid, polyphase composition of matter according to claim 1, wherein aligned crystallites have a rod-like form.

3. The solid, polyphase composition of matter according to claim 2, wherein the rod-like crystallites are substantially parallel to each other and to a common direction, and have a spherical excess of less than 20 percent.

4. The solid, polyphase composition of matter of claim 2, wherein the rod-like crystallites have a diameter of about 0.02 to 20 microns, and a length considerably greater than the diameter.

5. The solid, polyphase composition of matter of claim 2 wherein the rod-like crystallites have a diameter of about 0.02 to 10 microns, and a length of at least 100 microns.

6. The solid, polyphase composition of matter of claim 2, wherein the rod-like crystallites are substantially parallel to each other, and have a spherical excess of less than 5 percent.

7. The solid, polyphase composition of matter according to claim 1, wherein the aligned, three-dimensional crystallites have a plate-like form.

8. The solid, polyphase composition of matter according to claim 7 characterized by a microstructure wherein three-dimensional plate-like crystallites of one phase of the eutectic alternate with three-dimensional, plate-like crystallites of another phase of the eutectic, the crystallites of both phases being substantially parallel to a common direction.

9. The solid, polyphase composition of matter of claim 7 wherein the plate-like crystallites are parallel to one another within volumetric sections of the microstructure, and parallel to a common direction from section to section.

10. The solid, polyphase composition of matter according to claim 9, wherein the stereographic projection of the plate-like crystallites within a section have a spherical excess of less than 20 percent, and wherein the plate-like crystallites of all sections are parallel to the common direction within 30°.

11. The solid, polyphase composition of matter according to claim 9, wherein the stereographic projection of the plate-like crystallites within a section have a spherical excess of less than 5 percent, and wherein the plate-like crystallites of all sections are parallel to the common direction within 5°.

12. The solid, polyphase composition of matter of claim 7, wherein the plate-like crystallites have a thickness of about 0.02 to 20 microns, a width of at least three times the thickness, and a length considerably greater than the width.

13. The solid, polyphase composition of matter of claim 7 wherein proeutectic crystals are scattered throughout the microstructure.

14. The solid, polyphase composition of matter according to claim 1, comprising in addition to the inorganic compound a member selected from the group consisting of water, an element selected from the group consisting of Group 1A, 1B, 2A, 2B, 3A, 3B, 4A, 4B, 5A, 6A, 6B and 8 elements of the Periodic Table of Elements, and mixtures thereof.

15. In the method of forming a solid, anisotropic polyphase composition of matter having a microstructure of eutectic composition consisting substantially of three-dimensional crystallites of one phase of the eutectic imbedded in another phase, including the steps of establishing a eutectic mixture, heating the mixture to a temperature above the eutectic temperature to melt a portion thereof throughout its entire cross-sectional area and to establish a liquid-solid interface, unidirectionally solidifying at the liquid-solid interface by moving the interface in a direction such as to give the desired lamellar orientation, subjecting the interface to a cooling medium while the interface is moving in said direction to thereby simultaneously solidify at the interface at least two separate eutectic phases, and causing at least one of the eutectic phases to grow in the form of three-dimensional crystallites which are normal to the liquid-solid interface and parallel to the growth direction by regulating the solidification rate and the thermal gradient of the liquid at the liquid-solid interface so that the ratio of the thermal gradient in the liquid phase at the solid-liquid interface to the solidification rate is between about 0.1 and 1000° C./cm.$^2$/hr., the improvement which comprises utilizing as the starting material a eutectic mixture which is a member selected from the group of eutectics consisting of: KCl—LiCl; $BaFe_{12}O_{19}$—$BaFe_2O_4$; $MgCl_2$—KCl; $Al_2O_3$—$TiO_2$; PbO—$WO_3$; PbO—$PbM_oO_4$; FeO—FeS; CoO—FeS; $Li_2CO_3$—$CaCO_3$;

$$Li_2CO_3—Na_2CO_3$$

NaF—$CaF_2$; NaF—LiF; NaF—$MgF_2$; NaF—$PbF_2$; NaF—$CaF_2$—LiF; $CdBr_2$; $CdBr_2$—$ZnBr_2$; NaI—$HgI_2$; KI—$HgI_2$; AgI—NaI; $Ca(NO_3)_2$—$KNO_3$;

$$Ca(NO_3)_2—NaNO_3$$

$KNO_2$—$NaNO_2$; $K_2SO_4$; $CaSIO_3$—$Li_2SiO_3$; $Na_2O$—$P_2O_5$; CaO—$P_2O_5$; $La_2O_3$—$ZrO_2$; $K_2TiO_3$—$Na_2SO_4$;

$$K_2(WO_4)_2—K_4P_2O_7$$

$Na_4P_2O_7$—$Na_2WO_4$; $TiO_2$—$ZrO_2$; BaO—$ZrO_2$; LiCl—LiF; LiBr—LiF; $CaF_2$—LiF—NaF; $CaF_2$—CaO; $PbF_2$—PbO; LiCl—$Li_2CO_3$; NaBr—$Na_2O$—$SO_3$; $PbBr_2$—PbO;

$$KCl—K_2CrO_4$$

BaO—$B_2O_3$—$SiO_2$; CaO—$B_2O_3$—$SiO_2$; and $$SrO—B_2O_3—SiO_2$$

the composition of which eutectic mixture is such that the components thereof are reciprocally soluble in the liquid state, but simultaneously freeze out at a constant temperature into at least two different types of crystals upon cooling from the liquid state.

16. The improvement of claim 15, wherein the eutectic mixture comprises in addition to the inorganic compound a member selected from the group consisting of water and an element selected from the group consisting of Group 1A, 1B, 2A, 2B, 3A, 3B, 4A, 4B, 5A, 6A, 6B and 8 elements of the Periodic Table of Elements, and mixtures thereof.

No references cited.

LEON D. ROSDOL, Primary Examiner

I. GLUCK, Assistant Examiner

U.S. Cl. X.R.

23—295, 296